United States Patent [19]

Barge

[11] 4,296,892
[45] Oct. 27, 1981

[54] SPHERICAL LIVING MODULE OR SPACE

[76] Inventor: Presley O. Barge, 2868 Pine Pl., St. Louis, Mo. 63115

[21] Appl. No.: 26

[22] Filed: Jan. 2, 1979

[51] Int. Cl.³ .................. B64C 35/00; B64C 37/00; B64C 39/02
[52] U.S. Cl. ........................... 244/2; 114/249; 114/264; 114/292; 244/17.11; 244/12.2; 244/105; 52/79.8; D12/320; D12/2; D12/328
[58] Field of Search ............... 244/2, 3, 12.2, 12.3, 244/17.11, 17.17, 17.19, 17.21, 17.23, 23 B, 23 C, 105, 13, 106, 107; 9/1.3; 114/292, 61, 249, 264, 123, 267, 266; 405/189, 203; 52/79.8; D12/67, 73, 74, 2-4

[56] References Cited

U.S. PATENT DOCUMENTS

| | | | |
|---|---|---|---|
| 2,133,283 | 10/1938 | Dandini | 244/17.19 |
| 2,254,355 | 9/1941 | Dornier | 244/105 |
| 2,396,189 | 3/1946 | Millar | 244/105 |
| 2,463,351 | 3/1949 | Bowers | 244/105 X |
| 2,829,846 | 8/1958 | Keipes | 244/23 C |
| 2,841,832 | 7/1958 | Couse et al. | 52/79.8 |
| 2,862,680 | 12/1958 | Berger | 244/17.17 |
| 2,936,971 | 5/1960 | Holmes | 244/17.21 |
| 2,948,490 | 8/1960 | Verdugo Munoz | 244/17.19 |
| 2,950,074 | 8/1960 | Apostolescu | 244/17.23 |
| 2,973,169 | 2/1961 | Handler | 244/105 |
| 3,102,705 | 9/1963 | Namsick | 244/105 X |
| 3,249,322 | 5/1966 | Holland, Jr. | 244/3 |
| 3,261,572 | 7/1966 | Gorton | 244/2 |
| 3,493,982 | 2/1970 | Youngquist | 9/1.3 |
| 3,503,573 | 3/1970 | Modesti | 244/122 X |
| 3,507,461 | 4/1970 | Rosta | 244/23 C X |
| 3,933,325 | 1/1976 | Kaelin | 244/23 C |
| 3,995,793 | 12/1976 | Wing | 244/17.23 X |
| 4,165,059 | 8/1979 | Summer | 244/105 X |

FOREIGN PATENT DOCUMENTS

| | | | |
|---|---|---|---|
| 1118021 | 11/1961 | Fed. Rep. of Germany | 244/3 |
| 1082009 | 12/1954 | France | 244/17.11 |

Primary Examiner—Galen Barefoot

[57] ABSTRACT

A substantially spherical human living module or space has a plurality of pontoons projecting from its lower hemisphere. It is preferably arranged to be self-propelled, as a vehicle, and the pontoons are preferably extensible and retractable. In a version in which wheeled landing gear is provided, a spherical human living space is provided with helicopter blades and four jet engines at the bottom of the craft, and two jet engines on the right and left sides, which swivel for direction control, for propelling the device.

2 Claims, 11 Drawing Figures

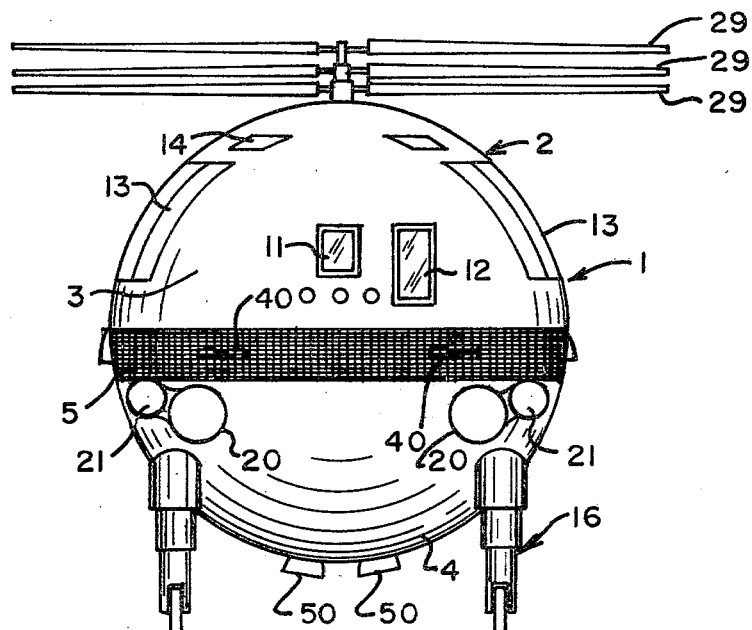
FIG. I.
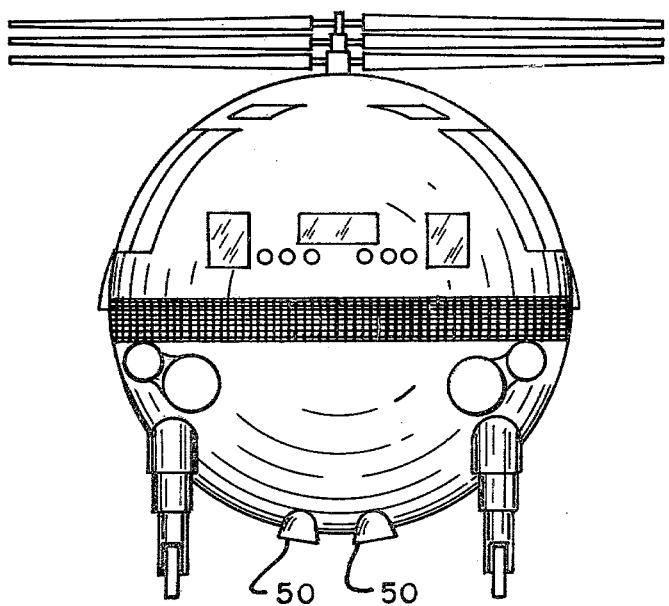
FIG. 2.

SPHERICAL LIVING MODULE OR SPACE

BACKGROUND OF THE INVENTION

The popularity of mobile homes of all sorts, and houseboats, demonstrates the desirability of living space which is transportable from place to place. The perils of flooding and fire are the subject of much of the news. This invention is designed for special accommodation to such incidents. A safety spray system externally and internally makes the craft safe during fire. Its ability to travel on water, land, in space, and in air, also makes it a safe residence in the event of floods, fire or other catastrophe.

This invention is a spaceship, mobile home, yacht, air-train, and vehicle. The craft is preferably equipped with generators in the top, with fans controlling the generators. When the module is used as a home, an annular deck in four (4) sections encircles the entire craft, which is an observation platform on water and a porch on the land. This deck is removeable when the craft is air-borne.

An object of the present invention is to provide a human living space which is efficient in terms of transportation in space, air, on water on land and of residence on earth and water, of utilization of materials, self-propelled, and extremely safe.

Other objects will become apparent to those skilled in the art in the light of the following description and accompanying drawing.

SUMMARY OF THE INVENTION

In accordance with this invention, generally stated, a substantially spherical human living space is provided. In its preferred form it has a plurality of pontoons projecting from its lower hemisphere, and is self-propelled. In still another embodiment, the device is so made as to be adapted to link with other such devices for forming a train capable of flight, and forming a train while air borne.

BRIEF DESCRIPTION OF THE DRAWING

In the drawing,

FIG. 1 is a view in front elevation of one illustrative embodiment of self-propelled spherical living space of this invention;

FIG. 2 is a view in rear elevation of the device shown in FIG. 1;

DESCRIPTION OF THE PREFERRED EMBODIMENTS

Figure 3:
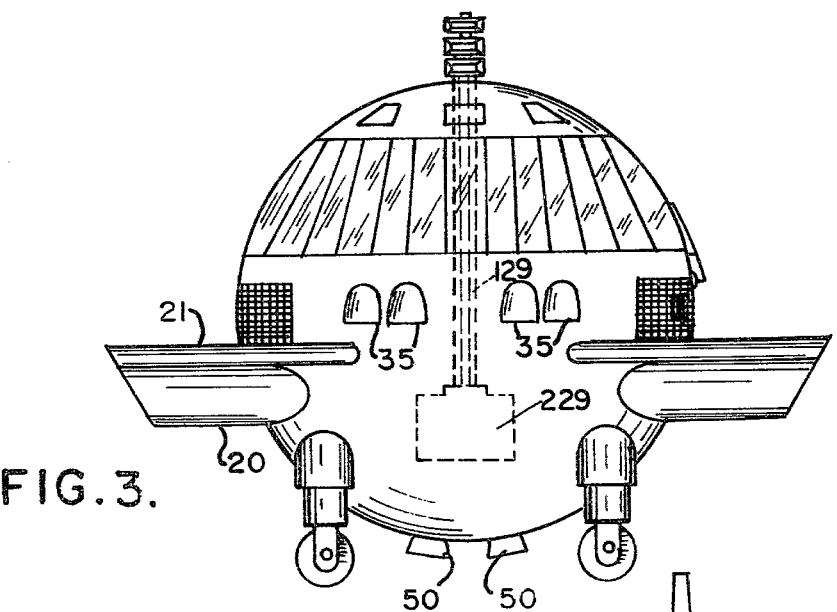
FIG. 3 is a view in side elevation of the device shown in FIGS. 1 and 2, with pontoons extended.

Referring now to the drawing for illustrative embodiments of this invention, reference numeral 1 indicates one illustrative embodiment of self-propelled spherical living space of this invention. The device 1 includes a spherical shell structure 2 divided generally in its interior into an active living space 3, a power and utility section 4, and a guidance and stabilizer section 5.

The living space section 3 has window areas 13. It preferably accommodates two floors, but the number of floors does not constitute a part of this invention. In any case, however, the spherical shell 2 is large enough to accommodate persons for dwelling purposes, to which end it should be on the order of at least 26 ft. in diameter.

As is apparent from the drawing, this embodiment of the device is intended to be self-propelled, and a cockpit area is provided within the shell behind the window or windshield 11. Suitable access doors, such as indicated at 12 are also provided.

In the upper part of the shell are emergency parachute hatches 14, below which are parachutes, best shown in connection with a different embodiment in FIG. 11, stored in such a way as to release automatically in the event of an emergency landing.

Figure 4:
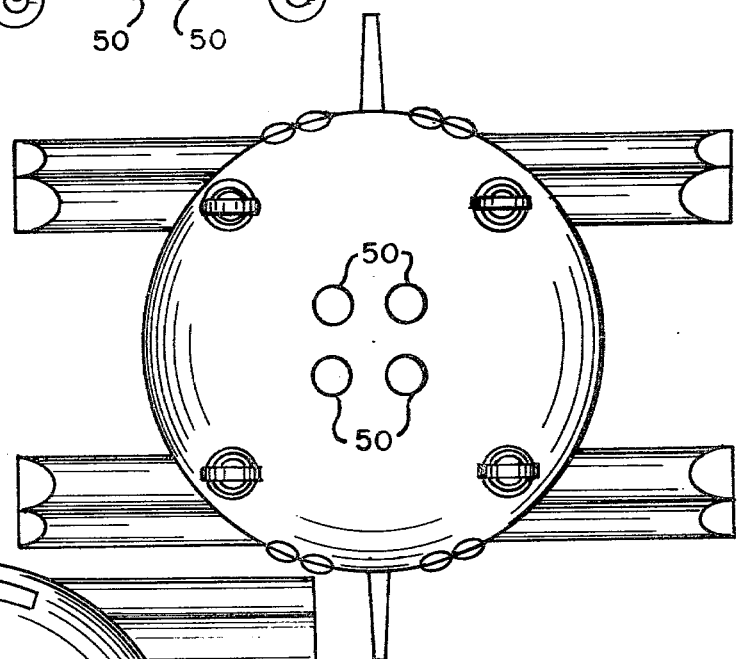
FIG. 4 is a bottom plan view of the device of FIGS. 1 through 3.
Figure 5:
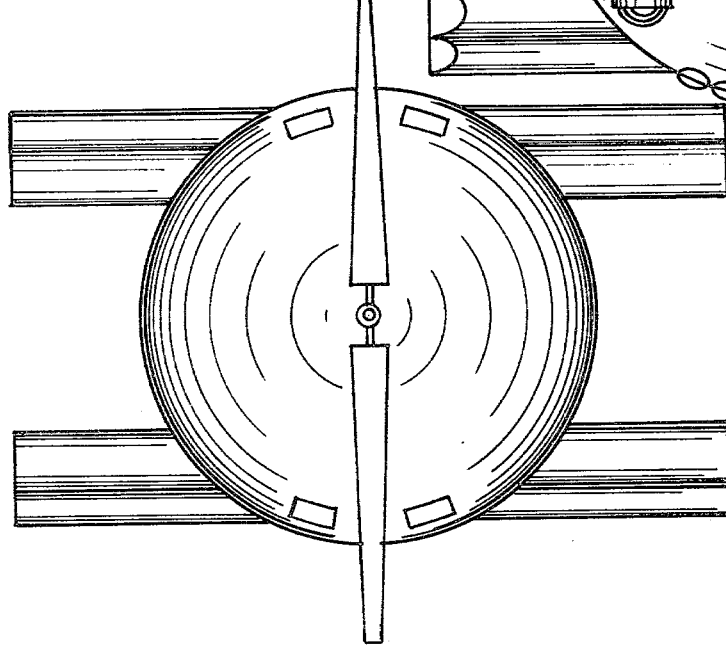
FIG. 5 is a top plan view of the device shown in FIGS. 1 through 4.

In this embodiment, two different supporting structures are provided, one in the form of telescoping, shock-absorbing landing gear 16, which may be provided with wheels 17, and pontoons 20 and 21, which are arranged in sets projecting chordally from the shell, spaced apart and parallel to one another as shown in FIG. 4.

The pontoons 20 and 21 are mounted to be extensible and retractable, the outer ends of the pontoons being contoured to conform with the contour of the shell when they are retracted. Suitable mechanical or hydraulic mechanisms for extending and retracting such element are well-known, as are suitable mechanisms for retracting and extending landing gear.

This embodiment of the device is provided with four distinct but cooperable propulsion systems. One propulsion system is a helicopter type. In the embodiment, three sets of helicopter blades 29 are shown, mounted on independently rotatable, concentric shafts 129, which can be driven by a conventional power plant 229, of the general type shown by Gorton U.S. Pat. No. 3,261,572 or Apostolescu, U.S. Pat. No. 2,950,074, preferably mounted within the power and utility section 4. The helicopter blades and shafts are preferably designed to permit the shafts to be retracted until they are substantially flush with the surface of the shell 2 and the blades are preferably made to fold within a recess provided, to conform to the contour of the shell, when they are not in use.

It will be appreciated that the torque and counter-torque of the rotating blades will be balanced conventionally.

In the embodiment shown, four jet engine pods 35, housing jet engines, are mounted on each side of a center line parallel to the axes of the pontoons, as best shown in FIGS. 3 and 4. The pods and their engines are pivotally mounted to permit their selective movement between a position at which a jet issuing from them moves parallel to the axes of the helicopter blade shafts and a position at which the jet is directed perpendicularly thereto.

As indicated in FIG. 1, a pair of propellers, spaced from one another and mounted for rotation on shafts extending substantially parallel with the long axes of the pontoons are provided within the guide and stabilizer section 5. This section of the shell is provided with openings, covered by a screen or lattice or shutter arrangement. The opening behind each propeller extends entirely, chordally, through the shell in a direction parallel to a plane parallel to the long axes of the pontoons. Within that space, in effect a conduit through the shell, in this embodiment are set within the air stream from the propellers 40, which normally would pass diametrically and linearly through the conduit, vertical rudders 41, hingedly mounted at 42 for selective movement to direct the stream of air from the propellers to one side or the other of its original direction of flow, and horizontal directing ailerons 46, hingedly mounted for selective movement up and down around a hinge 47 to direct the stream of air from the propellers upwardly or downwardly from its initial direction as the stream of air issues from the opening through the shell at the remote edge of the shell from the propellers.

In this embodiment, the device is also equipped with four rocket engines 50. These engines are equipped with nozzles which are preferably directed to produce lift in the direction of the axis of the helicopter shaft.

It is apparent that for ordinary flight, the helicopter blades 29, together with the propellers 40 will be adequate to accomplish the movement of the device through the air. However, at great altitudes and speeds, the effectiveness of the helicopter blades and propellers will be diminished, and the effectiveness of the jet engines and rockets will increase, so as to make them the preferred means of propulsion.

Figure 6:
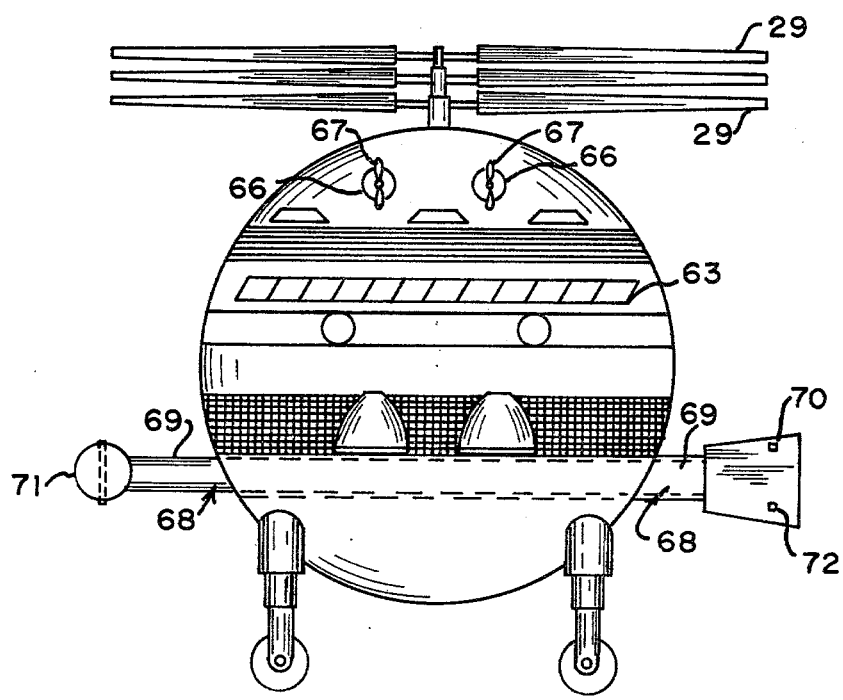
FIG. 6 is a view in side elevation of another embodiment of device of this invention.
Figure 7:
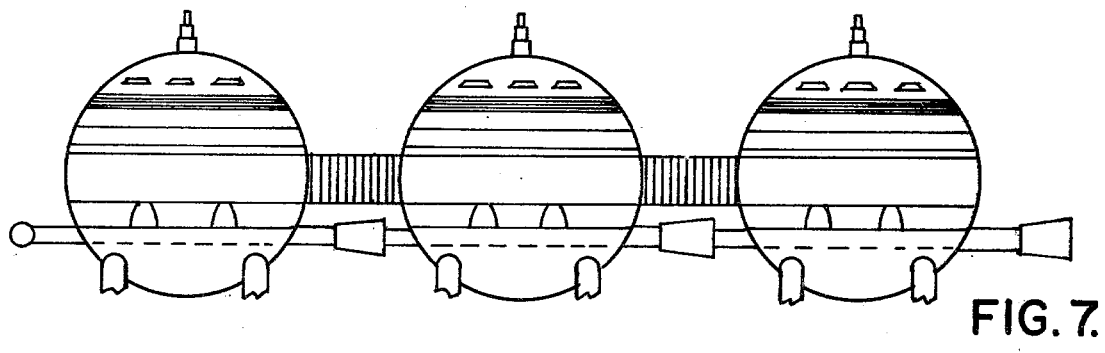
FIG. 7 is a view in side elevation of a plurality of the devices shown in FIG. 6 coupled to form a train.
Figures 8, 9, 10:
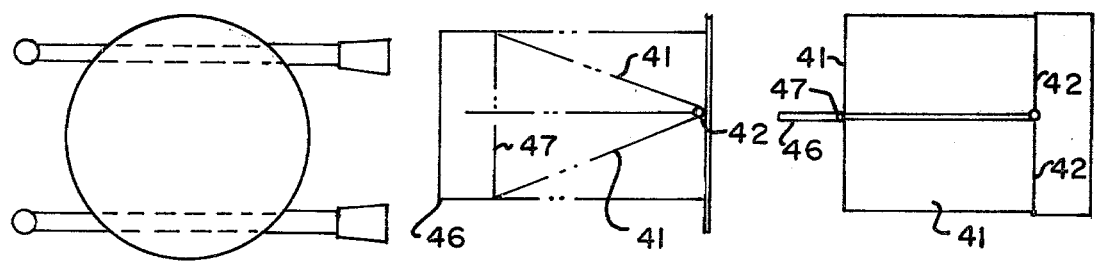
FIG. 8 is a bottom plan view of the device shown in FIGS. 6 and 7.
FIG. 9 is a top plan view of control rudder mechanism.
FIG. 10 is a view in side elevation of the rudder mechanism of FIG. 9.

Referring now to FIGS. 6 through 8 for another embodiment, reference numeral 60 indicates the device. Basically, the device 60 is the same as the device shown in FIGS. 1 through 5, 9 and 10. However, it differs in several important respects. A living space 63 of this embodiment is larger, by virtue of the moving of the guidance and stabilizing section down.

Dynamo-electric machines 66, with propellers 67, exposed to the atmosphere, are provided so arranged that when the propellers are driven by the dynamo-electric machines acting as motors, they assist in the propulsion and guidance of the device, and when the propellers are driven by the rush of air during descent, for example, they act as generators in a braking mode.

In this embodiment, the chief departure from the embodiment first described, lies in the construction of pontoons 68, which have cylindrical tubes 69 equipped at their outer ends with coupling members which at one end take the form of truncated conical or cup-shaped couplers 70, and at the other end, ball-shaped couplers 71. The cup-shaped couplers 70 have within them retainers 72, which can take the form of expansible and contractible rings, or a series of releasable locking lugs. In any event, the retainers 72 permit the entrance of a ball 71 and its capture, selectively. Those skilled in the art will recognize that there are countless practical ways of accomplishing the capture of the balls 71 and their selective release, the coupling art being an old and crowded one.

In this embodiment, access doors are provided along a center plane through the axes of the helicopter shafts and parallel with the long axes of the pontoons, and extendible gangplanks or walkways with enclosing vestibule-type walkway enclosures are provided whereby a series of devices can be coupled and linked, to form a train of the devices. Because all of the individual devices are self-propelled, they are capable of ascending and progressing as a train through the air.

Figure 11:
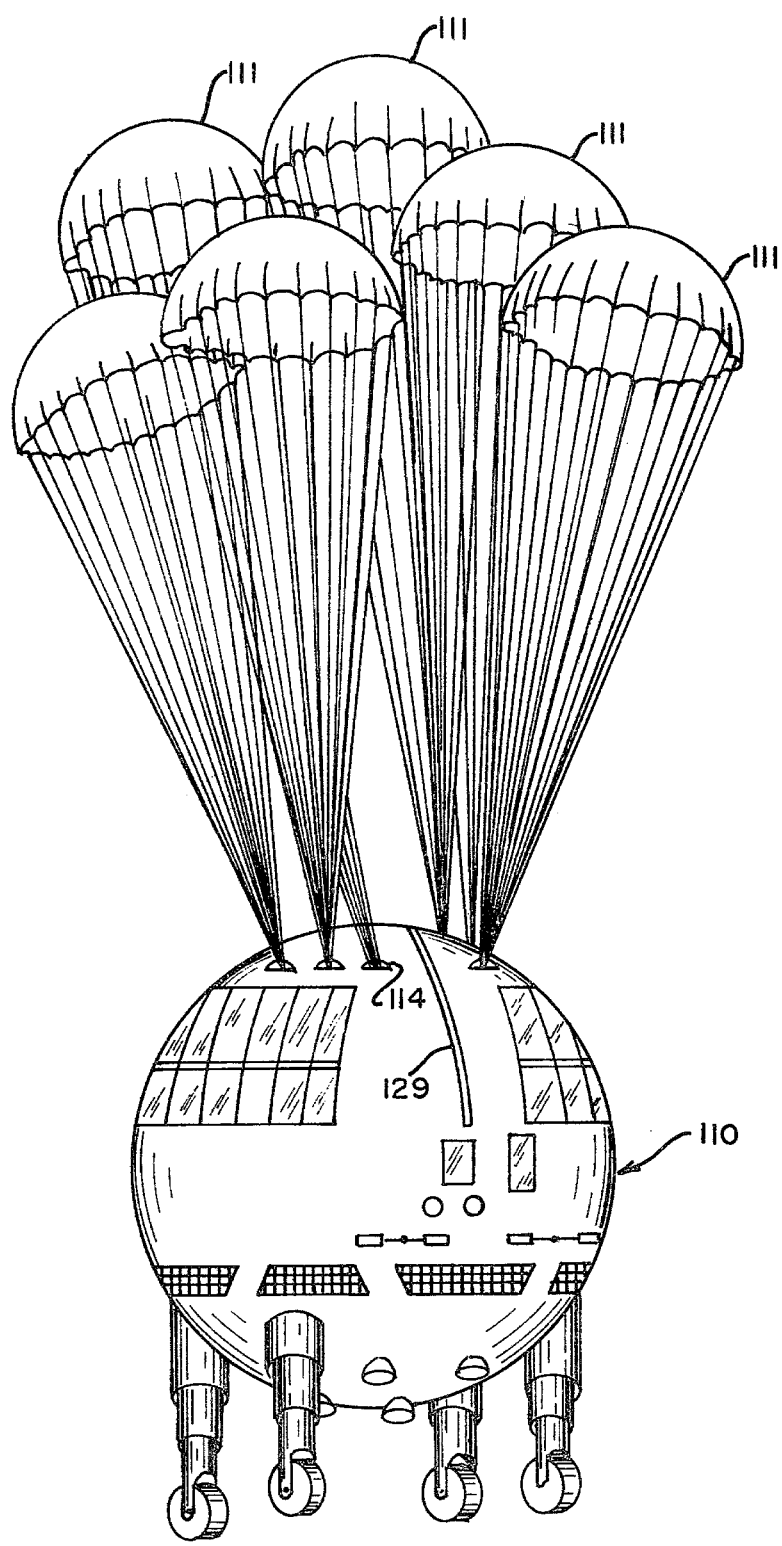
FIG. 11 is a view in perspective of still another embodiment of device of this invention showing emergency parachutes in operation.

Referring now to FIG. 11, reference numeral 110 indicates still another embodiment of device of this invention, the elements of which will be clear from the description of the embodiment shown in FIGS. 1 through 9. In this embodiment, a set of helicopter blades 129 is shown in its folded condition, and parachutes 111, issuing from emergency parachute hatches 114 are shown as lowering the device to earth in an emergency situation. If such an emergency occurs while the helicopter blades are in use, they can be locked against rotation to prevent the operation of the parachutes. It will be observed that in this embodiment no pontoons are provided. Although such a device will float in an emergency, it is designed chiefly for land use, being less stable on water than the embodiment with pontoons.

Numerous variations within the scope of the appended claims will occur to those skilled in the art in the light of the foregoing disclosure. The shell is preferably made of light material, such as aluminum, but it may be made of any suitable material, and may be thoroughly insulated and made virtually impregnable to fire, water and wind. The fact that a sphere provides the most volume for a given surface area makes its construction inexpensive compared with conventional shapes, and efficient in terms of heating and cooling. Suitable utility connections can be provided through the power and utility section, to permit attachment to existing or permanent water, electric, gas and sewage facilities.

The spherical shape tends to make the living module of this invention buoyant, and the function of the pontoons is chiefly to provide stability to the module when it is water borne, although they can, of course, provide any additional buoyancy which seems desirable.

A large number of small apertures in the shell can be and preferably are provided that can be put into immediate communication with a source of heat insulative or absorbent fluid (gas or liquid), which fluid, when released through the apertures, forms a protective barrier between the shell and an external source of heat.

Having thus described the invention, what is claimed and desired to be secured by Letters Patent is:

1. A substantially spherical self-propelled human living space comprising a shell, a plurality of elongated coaxial shafts journalled for rotation in said shell and projecting radially therefrom, helicopter blades mounted on said shafts outside said shell, and means within said shell for rotating said blades; and elongated pontoons, a set of said pontoons projecting chordally from said shell, spaced apart and parallel to one another, in one direction, and another set of said pontoons projecting chordally from said shell in the opposite direction, said sets of pontoons being aligned with one another, and coupling means carried by and at the ends of said pontoons, for engaging and coupling the complementary coupling means carried by pontoons of another of said living spaces.

2. A plurality of living spaces of claim 1 coupled by means of said pontoon-carried coupling means, each of said living spaces including access openings substantially diametrically arranged in said shell, and vestibule means extending to and between access openings in said coupled living spaces.

* * * * *